United States Patent
Hoffmann et al.

(10) Patent No.: US 6,207,289 B1
(45) Date of Patent: Mar. 27, 2001

(54) THERMOPLASTIC COMPOUND FOR FILLING PORES IN WOODEN MATERIALS

(75) Inventors: Horst Hoffmann, Bopfingen; Jutta Stiehl, Dresden; Dirk Hoppe, Nottuln, all of (DE)

(73) Assignees: Henkel Kommanditgesellschaft auf Aktien, Dusseldorf; Huels Aktiengellsellschaft, Marl, both of (DE)

(*) Notice: Subject to any disclaimer, the term of this patent is extended or adjusted under 35 U.S.C. 154(b) by 0 days.

(21) Appl. No.: 09/230,291

(22) PCT Filed: Jul. 15, 1997

(86) PCT No.: PCT/EP97/03780

§ 371 Date: Jan. 22, 1999

§ 102(e) Date: Jan. 22, 1999

(87) PCT Pub. No.: WO98/03317

PCT Pub. Date: Jan. 29, 1998

(30) Foreign Application Priority Data

Jul. 24, 1996 (DE) .............................. 196 29 702

(51) Int. Cl.[7] .......................... B32B 21/08; B32B 27/36; C08L 67/02; C08L 67/03; B05D 7/06
(52) U.S. Cl. ................. 428/481; 428/292.4; 428/305.5; 525/437; 525/444; 427/140; 427/331; 427/355; 427/369; 427/370; 427/371; 427/372.2; 427/375; 427/385.5; 427/389.9; 427/392; 427/393; 427/408
(58) Field of Search .............................. 428/292.4, 305.5, 428/480, 481; 427/140, 331, 355, 369, 370, 371, 372.2, 375, 384, 385.5, 389.9, 392, 393, 407.1, 408; 525/437, 444

(56) References Cited

U.S. PATENT DOCUMENTS

| | | |
|---|---|---|
| 3,575,136 | 4/1971 | Harder ................................ 118/410 |
| 3,619,228 * | 11/1971 | Hallonquist et al. ................... 117/2 |
| 4,576,997 * | 3/1986 | Trotter et al. ........................ 525/444 |
| 5,112,552 | 5/1992 | Wittmann et al. ................... 264/255 |
| 5,725,820 | 3/1998 | Reynolds et al. ................... 264/135 |

FOREIGN PATENT DOCUMENTS

| | | |
|---|---|---|
| 29 705 | 7/1964 | (DE) . |
| 11 80 122 | 10/1964 | (DE) . |
| 23 61 434 | 6/1974 | (DE) . |
| 23 61 365 | 6/1975 | (DE) . |
| 24 33 476 | 1/1979 | (DE) . |
| 37 31 430 | 4/1989 | (DE) . |
| 40 28 166 | 3/1992 | (DE) . |
| 0 576 682 | 1/1994 | (EP) . |
| 57-012081 * | 1/1982 | (JP) . |
| 3-087250 * | 4/1991 | (JP) . |
| WO96/16777 | 6/1996 | (WO) . |

OTHER PUBLICATIONS

Homag Technical Bullitin, TEF (Transfer Edge–Filling Foiling) Kantenverdichtung im Durchlaufverfahren.

DIN ISO 4625 Jun. 1981.

DIN 53765 Mar. 1994.

DIN 53728 Jan. 1970, Jan. 1985, Mar. 1975.

DIN ISO 1133 Feb. 1993.

\* cited by examiner

Primary Examiner—Vivian Chen
(74) Attorney, Agent, or Firm—Wayne C. Jaeschke; Stephen D. Harper

(57) ABSTRACT

A thermoplastic compound useful in filling pores and voids in wooden materials, particularly edge regions, wherein the thermoplastic compound comprises a blend of two copolyesters and optionally fillers, wherein the first copolyester has a melting point of 140° C. to 260° C. and a glass transition temperature of −10° C. to 80° C., and wherein the second copolyester has a melting point of 120° C. to 190° C. and a glass transition temperature of −70° C. to 10° C. Also, a method of filling pores in a wooden material comprising using a thermoplastic compound having a softening point of 140° C. to 200° C., an open time of 2 to 15 seconds, and a viscosity number of 30 to 150 ml/g, with the thermoplastic compound preferably being a blend of two different copolyesters, wherein the application of such thermoplastic compounds enable the surfaces of chipboard panels and the like to be smoothed in a continuous one-pass process. In particular, immediate aftertreatment such as milling is possible through the use of the thermoplastic compounds.

44 Claims, No Drawings

THERMOPLASTIC COMPOUND FOR FILLING PORES IN WOODEN MATERIALS

FIELD OF THE INVENTION

This invention relates to the use of a thermoplastic compound for filling pores in wood-based materials, more particularly in edges thereof.

BACKGROUND OF THE INVENTION

When the edges of board-like, batten-like or similar workpieces of open-pore wood-based materials, for example chipboards, or other open-pore materials are to be processed, they have to be improved for many applications because the open-pore cut surfaces of the workpieces lack surface quality and strength. Accordingly, various processes have been developed for improving open-pore edges, for example of chipboards.

Thus, in one of their prospectuses, the Homag company describes a one-pass edge sealing process. This process is based on the filling of the voids present in the edges of wood-based materials, where they are particularly conspicuous in the middle layer, so that an uninterrupted, pore-free and smooth surface is formed. To this end, a thermoplastic filler (a hotmelt material) is applied in the form of a hot paste and pressed into the pores. The filler hardens in the following cold phase. The entire process takes place in a single pass, as known from standard edge banding machines. The surface thus formed is immediately smoothed and can be film-coated at a following station in the same machine. This one-pass process comprises the following steps:

1. Preliminary milling and shaping of the profiles.
2. Application of the thermoplastic edge sealing compound by a roll-on process carried out at temperatures of 180 to 230° C. and preferably at 190 to 220° C.
3. After application, the sealing compound is smoothed with heated metal shoes (temperature 160 to 180° C.).
4. After smoothing, the sealed edge is cooled with air-cooled metal shoes.
5. Steps 2 to 4 are repeated so that a second layer is built up, giving a pore-free smooth edge surface.
6. Milling of the cooled edge sealing compound and further edge processing, for example embossing with heat-sealing film, jacketing, postforming and printing.

The one-pass process is carried out at speeds of 10 to 30 m/min. and preferably 15 to 25 m/min.

The thermoplastic edge sealing compound is expected to satisfy the following requirements:

The compound should show good flow behavior at the processing temperature and should readily be able to be pressed into the pores of the chipboard by the roller.

It should show good adhesion to the chipboard material and to itself (process steps 2 to 4 are repeated) so that no delamination occurs during the second application.

In addition, the hardened compound should adhere well to heat sealing films, adhesives and printing inks.

The compound should become strong and hard very quickly in process step 4 (cooling) because milling is carried out immediately afterwards.

The hardened edge sealing compound should have high impact strength with no tendency towards embrittlement.

Accordingly, the problem addressed by the invention was to provide a thermoplastic compound with which edges of porous wood-based materials could be improved in a one-pass process.

The solution to this problem as provided by the invention is defined in the claims and consists essentially in the selection of a thermoplastic compound according to softening point, open time and viscosity number.

DETAILED DESCRIPTION OF THE INVENTION

The softening point should be between 140 and 240° C. and, more particularly, between 160 and 200° C. It is determined in accordance with DIN ISO 4625 where the sample is poured as a melt into a ring and, after solidification of the melt (or recrystallization in the case of crystalline substances), the ring is placed in a test stand. A chromium-plated steel ball is applied to the centre of the sample and the test stand is immersed in a glycerol bath. The glycerol is heated at a rate of 5° C./min. The softening point (R+B) is the temperature of the glycerol bath at the moment the steel ball contacts the baseplate of the test stand.

The melting point has a certain correspondence to the softening point. It should be between 120 and 260° C., more particularly between 150 and 200° C. and above all between 130 and 180° C. The melting point is determined with a differential scanning calorimeter (DSC) in accordance with DIN 53 765. The sample and an empty reference pan are heated at 20° C./min. The melting point corresponds to the maximum of the melting peak. In the interests of better reproducibility, the values of the second heating are generally used.

The open time is a measure of the crystallization rate. It should be between 2 and 15 seconds and, more particularly, between 2 and 10 seconds. The open time was determined by the following method: the melt heated just beyond the melting point (or pour point in the case of amorphous substances) is spread uniformly and thinly with a knife onto a substrate (paper or paperboard). The time elapsing from spreading of the melt to the moment the film surface becomes tack-free is then measured. With crystalline and partly crystalline products, this period of time can be optically monitored because, in their case, setting is the same in terms of time as recrystallization.

Another key property of the thermoplastic compound is its viscosity number. This should be between 50 and 150 and preferably between 30 and 100 ml/g and is measured in accordance with DIN 53 728. 0.5 g of substance is dissolved in 100 ml of a mixture of 50% by weight of phenol and 50% by weight of 1,2-dichlorobenzene. The flow time of the resulting solution is determined in an Ubbelohde capillary viscosimeter. The viscosity number J is calculated in accordance with the following formula:

$$J = \frac{t_1}{t_2} \frac{1}{c}$$

where $t_1$ is the flow time of the solution [s]

$t_2$ is the flow time of the solvent [s]

c is the concentration of the test substance.

The melt viscosity has a certain correspondence to the viscosity number and should be in the range from 15 to 250 Pas and preferably in the range from 20 to 150 Pas at 200° C., as measured in accordance with Brookfield RVT, DV-II, Sp. 27.

The thermoplastic compounds according to the invention are preferably of medium to high crystallinity as reflected, for example, in the enthalpy of fusion of more than 25 joules/g and preferably in the range from 35 to 45 joules/g in the case of copolyesters.

The glass point of the thermoplastic compounds according to the invention is preferably between −70 and +80° C., more preferably between −50 and +70° C. and above all between −10 and 0° C. Like the melting point, the glass point is determined in accordance with DIN 53 765. The DSC should show several, more particularly two, glass points.

The thermoplastic compound preferably consists of at least two components, the first component having a high crystallinity of 35 to 45 joules/g and a glass point above 0° C. and the second component having a medium to high crystallinity of 20 to 45 joules/g and a glass point below 0° C.

The thermoplastic compound may be a polyamide, polyolefin or polyacrylate, but is preferably a polyester (homo- or copolyester).

The polyester compound preferably consists of a mixture of 5 to 95 parts of a copolyester (CoPES) A and 95 to 5 parts of a copolyester (CoPES) B, CoPES A being characterized by a melting point of 140 to 260° C. and preferably 150 to 200° C., a viscosity number of 50 to 150 ml/g and a glass temperature of −10 to 80° C. and preferably 0 to 70° C. and CoPES B being characterized by a melting point of 120 to 190° C. and preferably 130 to 180° C., a viscosity number of 50 to 150 ml/g and a glass temperature of −70 to 10° C. and preferably −50 to 0° C.

Particular preference is attributed to a mixture of CoPES A and CoPES B in which both are characterized in that one or more aromatic dicarboxylic acids and optionally one or more aliphatic dicarboxylic acids containing 4 to 12 carbon atoms are used as the acid component. The preferred aromatic dicarboxylic acids are terephthalic acid and isophthalic acid. One or more aliphatic diols containing 2 to 20 and preferably 2 to 12 carbon atoms are used as the diol component. A maximum of 1 mole-% of tri- and polycarboxylic acids and tri- and polyols may also be used in order to obtain branched systems.

Besides these thermoplastic polymers, the thermoplastic compound may contain other substances, for example fillers, dyes and pigments, heat stabilizers and antiagers.

The thermoplastic compound according to the invention preferably consists of 50 to 100% of a thermoplastic polymer, 0 to 50% of a filler and 0.1 to 1% of a heat stabilizer or antiager.

The fillers are fillers with a density of 2 to 5 g/cm$^3$, for example talcum, titanium oxide and, in particular, heavy spar and/or chalk. The filler preferably has an oil absorption value of 8 to 20 g/100 g and a Mohs hardness of 2 to 4.

The thermoplastic edge improving compounds are preferably prepared from the components mentioned above by mixing in the melt at melt temperatures above 180° C. either in a kneader or in a twin-screw extruder.

The thermoplastic compounds according to the invention are preferably applied continuously to the edge by a nozzle, an applicator roller or a transfer tape.

The thermoplastic compounds to be used in accordance with the invention are designed for the one-pass processing of edges of board-like, batten-like or similar workpieces of open-pore wood-based materials and the like in which the edge of the workpiece is milled and/or sanded, a hot improving compound is applied to the edge and the hot improving compound applied is smoothed in a single pass, i.e. with the workpiece clamped in the same position. Smoothing of the hot improving compound ensures its uniform penetration into the pores present in the edge of the workpiece. In addition, the hot smoothing step minimizes the consumption of improving compound and the surface which the edge of the workpiece has after this step alone is of comparatively high quality, i.e. is comparatively smooth.

In one embodiment of the edge smoothing process, the application and hot smoothing of the improving compound is repeated one or more times during the pass. In other words, the hot improving compound is applied and smoothed in steps with the workpiece clamped in the same position. By repeated application and hot smoothing of the improving compound, this processing step can be divided, for example, into preliminary and final improvement.

The hot smoothing of the improving compound is preferably followed by a sanding step, for example fine sanding. The surface of the improved edge is thus further smoothed and possible overhangs of the applied improving compound are eliminated. If the hot improving compound is applied and smoothed in steps, each hot smoothing step may be followed by a sanding step.

In another embodiment of the process, a second improving component is additionally applied to the improving compound. This second improving component, which is applied to the optionally fine-sanded improving compound, may be an improving compound similar to, but differing in composition from, the first improving compound or may be a lacquer/paint or the like. An improving compound of different composition could, for example, contain pigments to color the outer improving layer accordingly whereas a lacquer/paint, for example, could further improve surface quality.

If the workpiece is not intended to have flat edges, but profiled, i.e. for example rounded, edges instead, the milling and/or sanding step is preferably carried out as profile milling and/or profile sanding. In this way, the edge of the workpiece can be successively subjected to profiling and preliminary improvement in the same pass with the workpiece clamped in the same position.

In another embodiment of the process, the workpiece can be subsequently lacquered/painted, dried by UV irradiation and sanded in the same pass. Accordingly, the workpiece can be profiled, improved, optionally fine-sanded and then lacquered/painted all in the same pass.

In another advantageous embodiment of the invention, hot embossing in which, for example, a thin decorative paper film is applied is carried out as an additional step in the same pass. The hot embossing step may be carried out, for example, immediately after the improving step or even the lacquering/painting step. In another preferred embodiment of the process, glueing with a coating material, for example a thin decorative paper, may be carried out as an additional step in the same pass. Like the hot embossing step, the glueing step may be carried out either after the improving step or after the lacquering/painting step.

Accordingly, the edge of the workpiece can be processed, i.e. profiled, improved, lacquered/painted and/or hot-embossed or glued with a coating material, in one continuous pass with the workpiece clamped in the same position.

The thermoplastic compounds to be used in accordance with the invention not only provide for smooth processing by the one-pass method, which is ensured above all by the low processing viscosity and the immediate further processability, they also offer valuable performance properties in the form of a high softening point and impact strength.

The invention is illustrated by the following Examples.

I Starting materials
  1. The linear saturated copolyester Dynapol S 361 with a softening point of 178° C., a melting point of 175° C., a glass point of −12° C., a viscosity number of 82 cm³/g and an open time of 5 secs.

2. The linear saturated polyester Dynapol S 243 with a softening point of 194° C., a melting point of 192° C., a glass point of 37° C., a viscosity number of 68 cm³/g and an open time of 6 secs.

3. The linear saturated polyester Dynapol S 341 with a softening point of 155° C., a melting point of 150° C., a glass point of −28° C., a viscosity number of 66 cm³/g and an open time of 10 secs.

4. Chalk with an oil absorption value of 15 to 20 g/100 g and a Mohs hardness of 2 to 4.

II Production and properties of the thermoplastic compounds

The above-mentioned components are mixed in the melt for 1 hour in a kneader in the quantities shown in the Table (% by weight) to form the thermoplastic compounds according to the invention. Their characteristic data are also shown in the Table. "MFR" stands for melt index (melt flow rate) as measured in accordance with DIN ISO 1133.

The values were obtained as follows:

| Batch No. | Dynapol S 243 | Dynapol S 361 | Dynapol S 341 | Chalk | Soft. point (R + B)* [° C.] | MFR (200° C.) [g/10 mins.] | Melt visc. (Brookfield, 200° C. [Pas] |
|---|---|---|---|---|---|---|---|
| 1 | 35 | 35 |    | 30 | 193 | 91  | 127 |
| 2 | 35 |    | 35 | 30 | 193 | 167 | 64  |
| 3 | 30 |    | 30 | 40 | 193 | 114 | 110 |

*Ring and ball

All three compounds according to the invention could be satisfactorily applied to edges of chipboards and milled by the one-pass method without any delays in production.

What is claimed is:

1. A method of filling pores in a wood-based material comprising the step of applying a thermoplastic compound to said wood-based material, said thermoplastic compound being characterized by a softening point of 140° C. to 240° C., an open time of 2 seconds to 15 seconds, and a viscosity number of 50 ml/g to 150 ml/g.

2. The method of claim 1 wherein the thermoplastic compound has a glass point of −70° to +80° C.

3. The method of claim 2 wherein the thermoplastic compound has at least two glass points.

4. The method of claim 1 wherein the thermoplastic compound has an enthalpy of fusion of more than 25 joules/g.

5. The method of claim 1 wherein the thermoplastic compound has a Brookfield melt viscosity at 200° C. of 15 Pas to 250 Pas.

6. The method of claim 1 wherein the thermoplastic compound is comprised of a first copolyester component and a second copolyester component, the first polyester component having an enthalpy of fusion of 35 joules/g to 45 joules/g and a glass point above 0° C. and the second copolyester component having an enthalpy of fusion of 20 joules/g to 45 joules/g and a glass point below 0° C.

7. The method of claim 6 wherein the first copolyester component has a melting point of 140° C. to 260° C., a viscosity number of 50 to 150 ml/g, and a glass point of not greater than 70° C.

8. The method of claim 6 wherein the second copolyester component has a melting point of 120° C. to 190° C., a viscosity number of 50 to 150 ml/g and a glass temperature not less than −50° C.

9. The method of claim 6 wherein the thermoplastic compound is comprised of 50% to 100% by weight of a thermoplastic polymer component and 0% to 50% by weight of a filler.

10. The method of claim 9 wherein the thermoplastic polymer component is comprised of 5 to 95 parts by weight of the first copolyester component and 95 to 5 parts by weight of the second copolyester component.

11. The method of claim 6 wherein both the first copolyester component and the second copolyester component contain one or more aromatic dicarboxylic acids as an acid component and one or more diols containing 2 to 20 carbon atoms as a diol component.

12. The method of claim 1 wherein the thermoplastic compound is applied to the wood-based material by a means selected from the group consisting of nozzles, applicator rollers, and transfer tapes.

13. The method of claim 1 wherein the wood-based material is a chipboard.

14. The method of claim 1 comprising the further step of smoothing the thermoplastic compound after application to the wood-based material.

15. The method of claim 14 wherein said smoothing is accomplished by means of one or more heated metal shoes.

16. The method of claim 14 comprising the further step of sanding the thermoplastic compound after smoothing.

17. The method of claim 1 wherein application of the thermoplastic compound is carried out at a temperature of 180° C. to 230° C.

18. A method of filling pores in a wood-based material comprising the steps of:
    (a) applying a thermoplastic compound to said wood-based material; and
    (b) smoothing the thermoplastic compound;
wherein the thermoplastic compound is characterized by a softening point of 160° C. and 200° C., an open time of between 2 and 10 seconds, and a viscosity number of between 50 and 100 ml/g and is comprised of a first copolyester component and a second copolyester component.

19. The method of claim 18 wherein the first copolyester component has an enthalpy of fusion of 35 joules/g to 45 joules/g and a glass point above 0° C. and the second copolyester component has an enthalpy of fusion of 20 joules/g to 45 joules/g and a glass point below 0° C.

20. The method of claim 18 wherein the first copolyester component has a melting point of 150° C. to 200° C., a viscosity number of 50 to 150 ml/g, and a glass point of not greater than 70° C.

21. The method of claim 18 wherein the second copolyester component has a melting point of 130° C. to 180° C., a viscosity number of 50 to 150 ml/g and a glass temperature not less than −50° C.

22. The method of claim 18 wherein the thermoplastic compound is comprised of 50% to 100% by weight of the thermoplastic component and 0% to 50% by weight of a filler, with the thermoplastic component being comprised of 5 to 95 parts by weight of the first copolyester component and 95 to 5 parts by weight of the second copolyester component.

23. The method of claim 18 wherein both the first copolyester component and the second copolyester component contain one or more aromatic dicarboxylic acids as an acid component and one or more diols containing 7 to 12 carbon atoms as a diol component.

24. The method of claim 18 wherein the wood-based material is a chipboard.

25. The method of claim 18 wherein said smoothing is accomplished by means of one or more heated metal shoes.

26. The method of claim 18 wherein application of the thermoplastic compound is carried out at a temperature of 190° C. to 220° C.

27. The method of claim 18 wherein both steps (a) and (b) are each repeated at least once.

28. The method of claim 18 comprising the further step of sanding the thermoplastic compound after smoothing.

29. The method of claim 18 comprising the further step of applying a second improving component to the wood-based material after smoothing.

30. The method of claim 18 comprising the further step of hot embossing a thin decorative paper film to the wood-based material after smoothing.

31. The method of claim 18 comprising the further step of gluing a coating material to the wood-based material after smoothing.

32. A thermoplastic compound comprising a thermoplastic polymer component comprised of:
   (a) a first copolyester component having a melting point of 140° C. to 260° C., a viscosity number of 50 to 150 ml/g, and a glass temperature of −10° C. to +80° C.; and
   (b) a second copolyester component having a melting point of 120° C. to 190° C., a viscosity number of 50 to 150 ml/g, and a glass temperature of −70° C. to +10° C.

33. The thermoplastic compound of claim 32 wherein the thermoplastic polymer component comprises from 50% to 100% of the thermoplastic compound.

34. The thermoplastic compound of claim 33 wherein the thermoplastic polymer component is comprised of 5 to 95 parts by weight of the first copolyester component and 95 to 5 parts by weight of the second copolyester component.

35. The thermoplastic compound of claim 32, wherein the thermoplastic compound is additionally comprised of up to 50% by weight of a filler.

36. The thermoplastic compound at claim 32 wherein the first copolyester component has a melting point of 150° C. to 200° C., a viscosity number of 50 to 100 ml/g, and a glass temperature of 0° C. to 70° C.

37. The thermoplastic compound of claim 32 wherein the second copolyester compound has a melting point of 130° C. to 180° C., a viscosity number of 50 to 100 ml/g, and a glass temperature of −50° C. to 0° C.

38. The thermoplastic compound of claim 32 wherein both the first copolyester component and the second copolyester component contain one or more aromatic dicarboxylic acids as an acid component and one or more aliphatic diols containing 2 to 20 carbon atoms as a diol component.

39. A workpiece comprised of a wood-based material and the thermoplastic pound of claim 32.

40. A thermoplastic compound comprising
   (a) from 50% to 100% by weight of a thermoplastic polymer component comprised of
      (i) 5 to 95 parts by weight of a first copolyester component having a melting point of 150° C. to 200° C., a viscosity number of 50 to 100 ml/g, and a glass temperature of 0° C. to 70° C.; and
      (ii) 95 to 5 parts by weight of a second copolyester component having a melting point of 130° C. to 180° C., a viscosity number of 50 to 100 ml/g, and a glass temperature of −50° C. to 0° C.; and
   (b) 0% to 50% of a filler.

41. The thermoplastic compound of claim 40 wherein the first copolyester has an enthalpy of fusion of 35 to 45 joules/g and the second copolyester component has an enthalpy of fusion of 20 to 45 joules/g.

42. The thermoplastic compound of claim 40 wherein the thermoplastic compound a melt viscosity of 20 to 150 Pas at 200° C.

43. The thermoplastic compound of claim 40 wherein both the first copolyester component and the second copolyester component contain one or more aromatic dicarboxylic acids selected from the group consisting of terephthalic acid and isophthalic as an acid component and one or more aliphatic diols containing 2 to 12 carbon ms as a diol component.

44. A workpiece comprised of a wood-based material and the thermoplastic pound of claim 40.

* * * * *